US009794339B2

(12) United States Patent
Clothier et al.

(10) Patent No.: US 9,794,339 B2
(45) Date of Patent: Oct. 17, 2017

(54) ACCELERATED REMOTE OPERATION SYSTEM API REQUESTS

(71) Applicant: Data Accelerator Ltd., London (GB)

(72) Inventors: Matthew P. Clothier, Chedzoy (GB); Sean P. Corbett, London (GB)

(73) Assignee: DATA ACCELERATOR LTD., London (GB)

( * ) Notice: Subject to any disclaimer, the term of this patent is extended or adjusted under 35 U.S.C. 154(b) by 155 days.

(21) Appl. No.: 14/485,592

(22) Filed: Sep. 12, 2014

(65) Prior Publication Data

US 2015/0074183 A1 Mar. 12, 2015

Related U.S. Application Data

(60) Provisional application No. 61/877,201, filed on Sep. 12, 2013.

(51) Int. Cl.
*H04L 29/08* (2006.01)

(52) U.S. Cl.
CPC ................... *H04L 67/1097* (2013.01)

(58) Field of Classification Search
CPC ................................... G06F 17/30902
See application file for complete search history.

(56) References Cited

U.S. PATENT DOCUMENTS

| 6,167,441 A * | 12/2000 | Himmel | G06F 17/30905 707/999.104 |
| 7,904,466 B1 * | 3/2011 | Valencia | G06F 17/30144 707/758 |
| 8,417,938 B1 * | 4/2013 | Considine | H04L 41/12 713/151 |
| 2006/0101082 A1 * | 5/2006 | Agrawal | G06F 17/30575 |
| 2008/0195819 A1 * | 8/2008 | Dumont | G06F 17/30902 711/138 |
| 2009/0100228 A1 * | 4/2009 | Lepeska | G06F 17/30902 711/125 |
| 2010/0138485 A1 * | 6/2010 | Chow | G06F 17/30902 709/203 |
| 2014/0282626 A1 * | 9/2014 | Muguda | G06F 9/54 719/328 |
| 2014/0304294 A1 * | 10/2014 | Sharma | G06F 17/30132 707/769 |

(Continued)

OTHER PUBLICATIONS

Petullo, W. Michael et al., "MinimaLT: Minimal-latency Networking Through Better Security," May 22, 2013 [retrieved online at http://cr.yp.to/tcpip/minimalt-20130522.pdf on Jun. 4, 2013].

*Primary Examiner* — Backhean Tiv

(57) ABSTRACT

Systems and method for remotely satisfying API (Application Programming Interface) requests made by an application executing at a client device. At an accelerated remote operations system server remote from the client device, an intercepted API request of an application executing at the client device is received. At the accelerated remote operations system server, an API response to the API request is determined using an API. The API response is compared to a previously determined API response for the API request to determine if the API response has changed. A response is sent to the client device based on whether the API response has changed and is used to continue execution of the application at the client device.

18 Claims, 9 Drawing Sheets

(56) References Cited

U.S. PATENT DOCUMENTS

2015/0074183 A1* 3/2015 Clothier .............. H04L 67/1097
709/203
2015/0201026 A1* 7/2015 Corbett ................ H04L 67/141
709/228

* cited by examiner

US 9,794,339 B2

ACCELERATED REMOTE OPERATION SYSTEM API REQUESTS

CROSS REFERENCE TO RELATED APPLICATIONS

This application claims the benefit of U.S. Provisional Patent Application Ser. No. 61/877,201, filed on Sep. 12, 2013, entitled "ACCELERATED REMOTE OPERATION SYSTEM API CALLS," which is incorporated herein by reference.

BACKGROUND

An area of ongoing research and development is improving access to cloud-based applications. Computer operating systems interact with applications using APIs (application programming interfaces). These API requests are used for many core functions of the operating system. One of these primary functions is accessing files from the file system. These API requests work on the assumption they are run locally and that subsequent sub-systems deal with any remote access to resources. There are issues related to using API calls to provide access to cloud-based applications and speeding up cloud-based applications through API requests.

Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, API requests made by an application executing at a client device are remotely satisfied. In various implementations, an intercepted API request of an application executing at the client device is received at an accelerated remote operations system server remote from the client device. Further, in various implementations, an API response to the API request is determined using an API at the accelerated remote operations system server. In various implementations, the API response is compared to a previously determined API response for the API request to determine if the API response has changed. Additionally, in various implementations, a response is sent to the client device based on whether the API response has changed and is used to continue execution of the application at the client device.

These and other advantages will become apparent to those skilled in the relevant art upon a reading of the following descriptions and a study of the several examples of the drawings.

DETAILED DESCRIPTION

Figure 1:
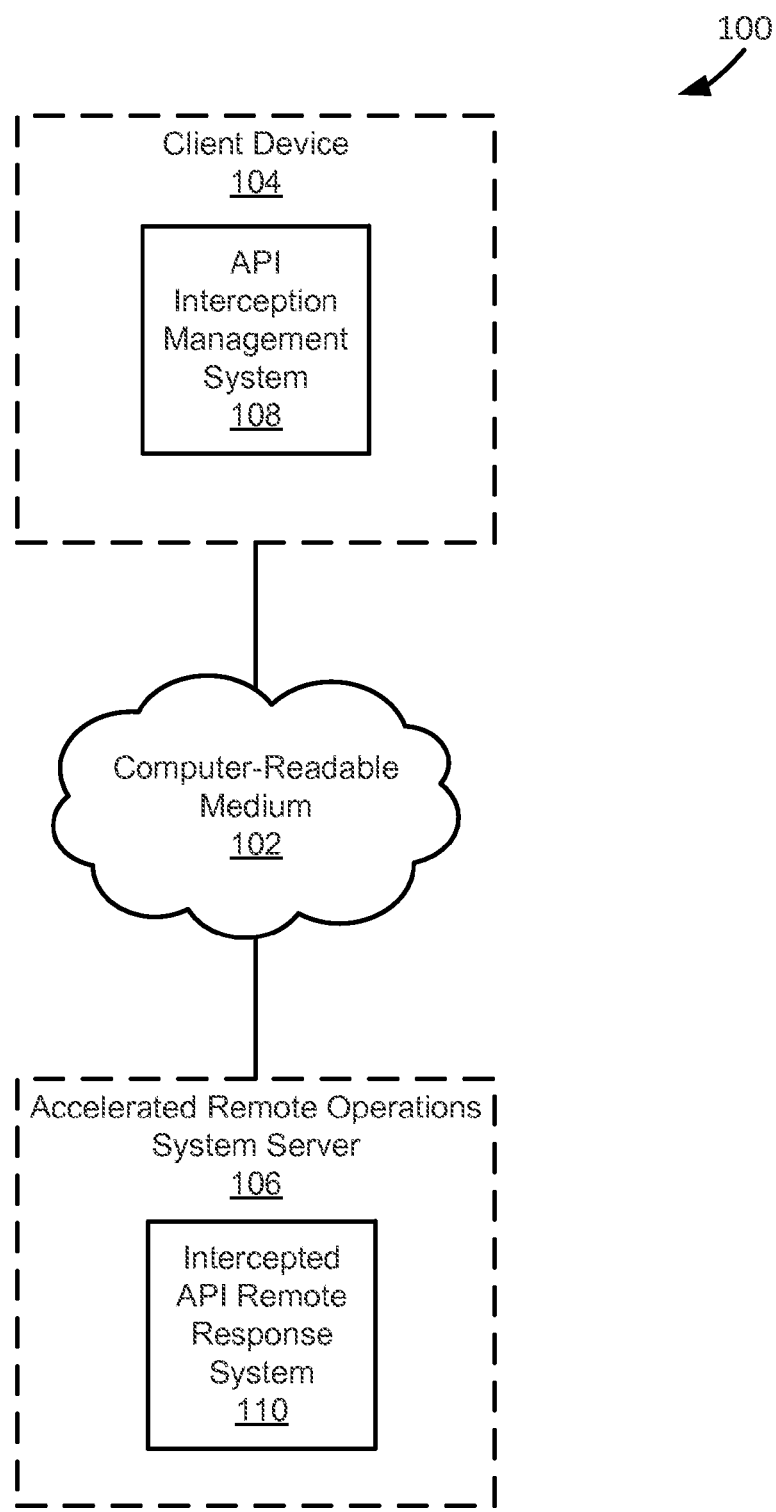
FIG. 1 depicts a diagram of an example of a system for intercepting API requests at a client device and satisfying the intercepted API requests remotely from the client device.

FIG. 1 depicts a diagram 100 of an example of a system for intercepting API requests at a client device and satisfying the intercepted API requests remotely from the client device. The system of the example of FIG. 1 includes a computer-readable medium 102, a client device 104, and an accelerated remote operations system server 106.

The client device 102 and the accelerated remote operations system server are coupled to each other through the computer-readable medium 102. Known computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the client device 104, the accelerated remote operations system server 106, and other applicable systems, or devices described in this paper can be implemented as a computer system, a plurality of computer systems, or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part" of a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the client device 104 functions according to an applicable device for executing an application. In executing an application, the client device can send and receive data. Depending upon implementation-specific or other considerations, an application executed at the client device 104 can reside only partially on the client device, thereby leading to virtualization of the application on the client device 104. Further depending upon implementation-specific or other considerations, the client device 104 can be a thin client or an ultra-thin client.

In a specific implementation, the accelerated remote operations system server 106 functions according to an applicable system for serving data to a client device. The accelerated remote operations system server 106 is remote from the client device 104. Depending upon implementation-specific or other considerations, the accelerated remote operations system server 106 functions to serve data, including API response to intercepted API requests, to a client device. Depending upon implementation-specific or other considerations, the accelerated remote operations system server 106 can be coupled to the client device 104 through either or both an applicable combination of a wired and a wireless network.

In the example system shown in FIG. 1, the client device 104 includes an API interception management system 108. In a specific implementation, the API interception management system 108 can intercept API requests for an application before or during execution of an application on the client device 104. In intercepting API requests made by an application executing on the client device 104, all or applicable portions of the API interception management system 108 can be implemented in a layer between the application executing in an application layer and an operating system executing in an operating system layer of the client device 104. Further depending upon implementation-specific or other considerations, in intercepting API requests made by an application executing on the client device 104, all or applicable portions of the API interception management system 108 can be implemented as part of an operating system layer in which an operating system is executed on the client device 104 or a hypervisor layer on the client device 104. The API interception management system can send intercepted API requests to the accelerated remote operations system server, where the requests can be satisfied.

In a specific implementation, the API interception management system 108 intercepts API requests according to remote access rules. As used in this paper, remote access rules are rules specifying which API requests to intercept and have fulfilled remotely away from a client device. For example, remote access rules can specify that if a specific file path is in an API request, then the API request should be intercepted and satisfied remotely from the client device. In using remote access rules to intercept API requests, the API interception management system 108 can inspect API requests as they are sent from an application to determine whether to intercept a specific API request and send the API requests to the accelerated remote operations system server 106. For example, the API interception management system 108 can inspect API requests to determine if a specific file path, as indicated by remote access rules, is present in the request to determine whether to intercept the request. Subsequently, the API interception management system 108 can intercept an API request after it has determined to intercept the API request.

In a specific implementation, the API interception management system 108 functions to manage remote access rules for intercepting API requests. In managing remote access rules, the API interception management system 108 can generate remote access rules, modify remote access rules, and/or cancel remote access rules. Depending upon implementation-specific or other considerations, the API interception management system 108 can manage remote access rules according to input from a user or an administrator. Further depending upon implementation-specific or other considerations, the API interception management system 108 can generate remote access rules based on previous execution of an application. For example, if during previous execution of an application, a response to a specific API request is found to be large, then the API interception management system 108 can generate remote access rules indicating to intercept the specific API request.

In the example system shown in FIG. 1, the accelerated remote operations system server 106 includes an intercepted API remote response system 110. In a specific implementation, the API remote response system 110 functions to determine an API response for intercepted API requests received from the API interception management system. Depending upon implementation-specific or other considerations, the intercepted API remote response system 110 can use device characteristics data, including registry settings of the client device 104, to determine an API response for an intercepted API request. In determining an API response, the intercepted API remote response system 110 can function to execute an intercepted API request received from the client device 104 to obtain the API response.

In a specific implementation, the intercepted API remote response system 110 functions to manipulate an API request before executing the API request. In manipulating an intercepted API request, the intercepted API remote response system 110 can execute multiple API requests for different client devices simultaneously, even if the intercepted API request is the same. In manipulating API requests, the intercepted API remote response system 110 can change or otherwise modify the API requests. In manipulating API requests, the client device 104 is agnostic as to whether the API requests are modified. Depending upon implementation-specific or other considerations, the intercepted API remote response system 110 can manipulate an intercepted API request according to the client device at which the API request is intercepted. Further depending upon implementation-specific or other considerations, the intercepted API remote response system 110 can manipulate an API request according to device characteristics data for the client device 104.

In a specific implementation, the intercepted API remote response system 110 stores at the accelerated remote operations system server, determined API responses and intercepted API requests. The intercepted API remote response system 110 can function to compare a determined API response with a previously determined API response. In comparing API responses, the intercepted API remote response system 110 can determine whether an API response is the same for the same intercepted API request. For example, if the same API request is received again, the intercepted API remote response system can determine whether an API response determined for the same intercepted API request has changed from when the intercepted API request was previously determined. Depending upon implementation-specific or other considerations, the intercepted API remote response system 110 can function to determine whether an API response has changed if the same intercepted API request is received from the same client device. In deciding whether a determined API response has changed, the intercepted API remote response system can look up an API response corresponding to the API request, as stored at the accelerated remote operations system server 106 and compare it to the determined API response.

In a specific implementation, the intercepted API remote response system 110 can return a determined API response to the client device 104. Depending upon implementation-specific or other considerations, the intercepted API remote response system 110 can return an unchanging notification if it determined that an API response has not changed. An unchanging notification can indicate that an API response has not changed.

In a specific implementation, the API interception management system 108 received a response from the intercepted API remote response system 110. The API interception management system 108 can function to determine whether a response received from the intercepted API remote response system 110 includes an API response, or is an unchanging notification. Depending upon implementation-specific or other considerations, if it is determined that the response is an unchanging notification, the API interception management system 108 can retrieve an API response corresponding to the API request for which the response is received from local storage at the client device. An API response at the client device 104 is used to begin or continue execution of an application at the client device.

In an example of operation of the example system shown in FIG. 1, the API interception management system 108 functions to intercept API requests made by an application executing on the client device 104. In the example of operation of the example system shown in FIG. 1, the intercepted API remote response system 110 receives intercepted API requests from the API interception management system 108. Additionally, in the example of operation of the example system shown in FIG. 1, the intercepted API remote response system 110 determines API responses for the intercepted API requests, and returns the API responses to the API interception management system 108.

Figure 2:
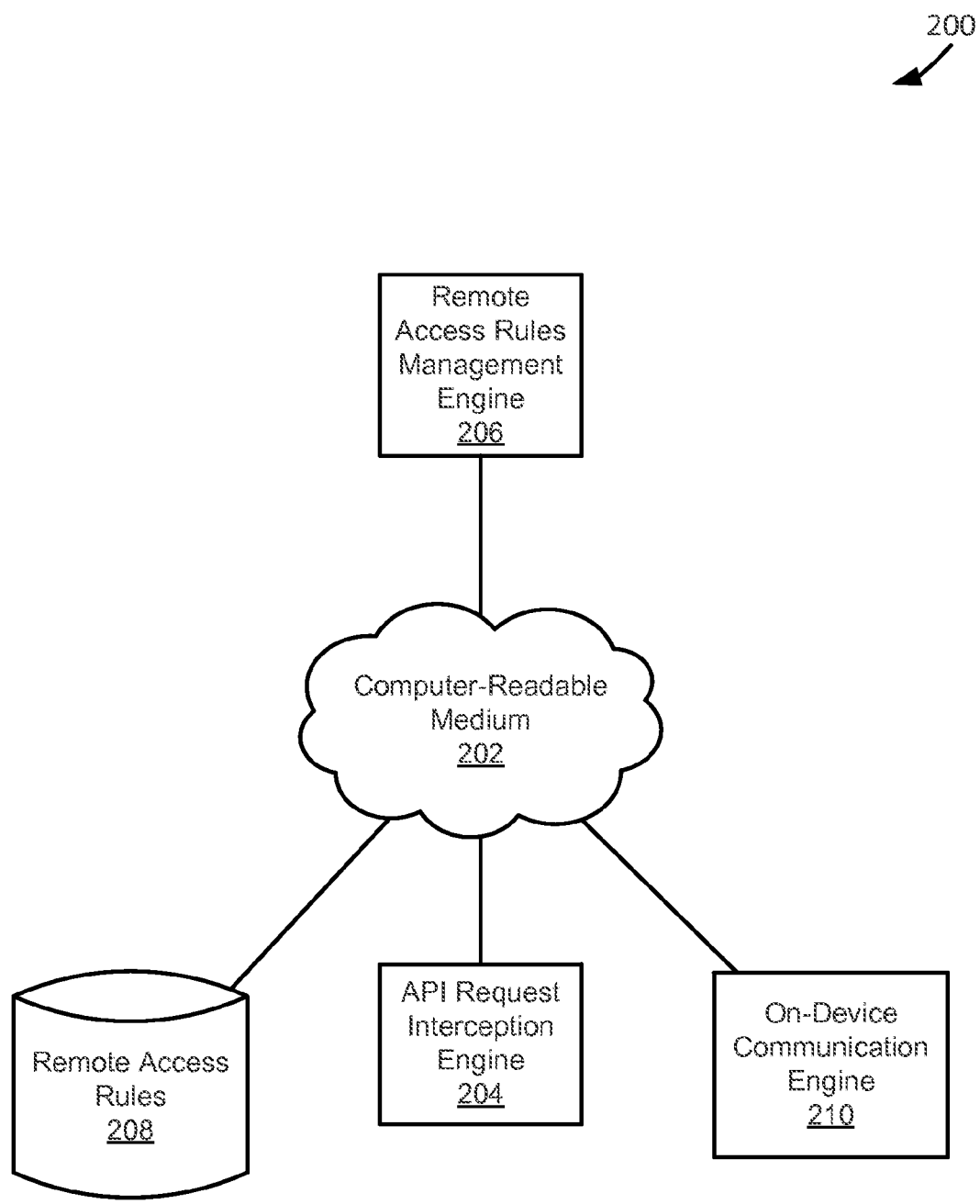
FIG. 2 depicts a diagram of an example of a system for intercepting API requests at a client device for satisfying the API requests remotely.

FIG. 2 depicts a diagram 200 of an example of a system for intercepting API requests at a client device for satisfying the API requests remotely. The example system shown in FIG. 2, includes a computer-readable medium 202, an API request interception engine 204, a remote access rules management engine 206, a remote access rules datastore 208, and an on-device communication engine 210. In the example system shown in FIG. 2, the API request interception engine 204, the remote access rules management engine 206, the remote access rules datastore 208, and the on-device communication engine 210 are coupled to each other through the computer-readable medium 202.

In a specific implementation, the API request interception engine 204 functions to intercept API requests of an application executing on a client device. In intercepting API requests made by an application, the API requests can be satisfied remotely, thereby virtualizing the application on the client device. Depending upon implementation-specific or other considerations, in intercepting API requests of an application, the API request interception engine 204 can be implemented in a layer between the application executing in an application layer and an operating system executing in an operating system layer of the client device. Further depending upon implementation-specific or other considerations, the API request interception engine 204 can be implemented as part of an operating system layer in which an operating system is executed on the client device or a hypervisor layer on the client device. Depending upon implementation-specific or other considerations, the API request interception engine 204 can intercept all API requests made by an application or specific API requests made by an application. In intercepting specific API requests made by an application, the API request interception engine 204 can inspect API requests to determine if the API requests are relevant, and subsequently intercept the API requests that it determines are relevant.

In a specific implementation, the remote access rules management engine 206 functions to manage remote access rules. In managing remote access rules, the remote access rules management engine 206 can generate remote access rules, modify remote access rules, and/or cancel remote access rules. Depending upon implementation-specific or other considerations, the remote access rules management engine 206 can manage access rules according to input from a user or an administrator. For example, if an administrator specifies that specific API requests should be satisfied remote from the client device, then the remote access rules management engine 206 can generate access rules specifying to intercept the specific API requests. Further depending upon implementation-specific or other considerations, the remote access rules management engine 206 can generate access rules based on previous execution of an application. For example, if during previous execution of an application, a response to a specific API request is found to be large, then the remote access rules management engine 206 can generate access rules specifying to intercept the specific API request.

In a specific implementation, the remote access rules datastore 208 functions to store remote access rules data indicating remote access rules. Remote access rules stored in the remote access rules data store as remote access rules data can be generated by the remote access rules management engine 206. Depending upon implementation-specific or other considerations, the remote access rules management engine 206 can change or cancel remote access rules by manipulating remote access rules data stored in the remote access rules datastore 208.

In a specific implementation, the API request interception engine 204 intercepts API requests according to remote access rules stored as remote access rules data in the remote access rules datastore 208. In using remote access rules to intercept API requests, the API request interception engine 204 can inspect API requests as they are sent from an application to determine whether to intercept a specific API request and send the API requests to a remote location. For example, the API request interception engine 204 can inspect API requests to determine if a specific file path, as indicated by remote access rules, is present in the request to determine whether to intercept the request. Subsequently, the API request interception engine 204 can intercept an API request after it has determined to intercept the API request.

In a specific implementation, the on-device communication engine 210 functions to communicate with systems and/or devices remote to a client device. The on-device communication engine 210 can communicate with an accelerated remote operations system server. In communicating with an accelerated remote operations system server, the on-device communication engine 210 can send API requests intercepted by the API request interception engine 204 to the accelerated remote operations server system. Depending upon implementation-specific or other considerations, the on-device communication engine 210 can send intercepted API requests through either a wired or wireless connection. Further depending upon implementation-specific or other considerations, in communicating with an accelerated remote operations system server, the on-device communication engine 210 can send device characteristics data of the client device to the accelerated remote operations system server. Device characteristics data, as used in this paper, includes applicable data describing the operation of a device, including application execution on the device. For example device characteristics data of a client device can include registry settings of the client device.

In an example of operation of the example system shown in FIG. 2, the remote access rules management engine manages remote access rules stored as remote access rules data in the remote access rules datastore 208. In the example of operation of the example system shown in FIG. 2, the API request interception engine 204 intercepts API requests of an application running on a client device according to remote access rules indicated by the remote access rules data stored in the remote access rules datastore 208. Further, in the example of operation of the example system shown in FIG. 2, the on-device communication engine 210 sends the intercepted API requests to an accelerated remote operations system server, where the API requests can be satisfied.

Figure 3:
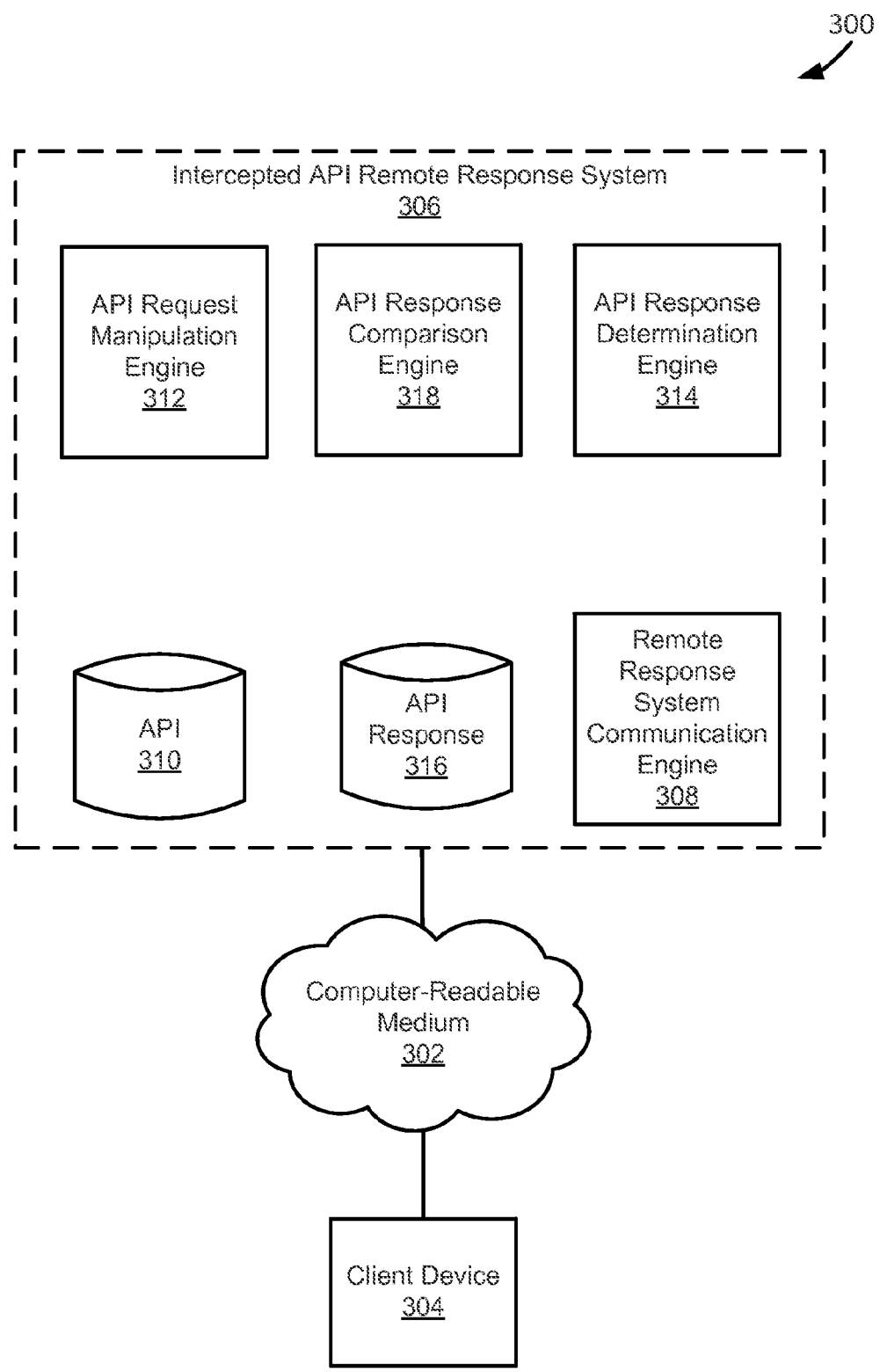
FIG. 3 depicts a diagram of an example of a system for remotely satisfying API requests of an application executing on a client device.

FIG. 3 depicts a diagram 300 of an example of a system for remotely satisfying API requests of an application executing on a client device. The example system shown in FIG. 3 includes a computer-readable medium 302, a client device 304, and an intercepted API remote response system 306. In the example system shown in FIG. 3, the client device 304 and the remote response system 306 are coupled to each other through the computer-readable medium 302. While only one client device 304 is coupled to the intercepted API remote response system 306, in various implementations, multiple client devices can be coupled to the intercepted API remote response system simultaneously.

In a specific implementation, the client device 304 functions according to an applicable device for executing an application, such as the client devices descried in this paper. The client device 304 includes applicable systems, such as the API interception management systems described in this paper, for intercepting API requests of an application executing on the client device and sending the intercepted API requests to a remote location where the requests can be satisfied. In satisfying API requests made by an application executing on the client device 304 remote from the client device 304, the application can be virtualized on the client device 304. Depending upon implementation-specific or other considerations, the client device 304 can be a thin client or an ultra-thin client.

In a specific implementation, the intercepted API remote response system 306 functions according to an applicable system for satisfying, remotely, API requests intercepted at a client device. The intercepted API remote response system 306 can be implemented as part of an accelerated remote operations system server. The intercepted API remote response system 306 can function to execute an intercepted API request received from the client device 304 to obtain an API response. An API response to an intercepted API request, as determined by the intercepted API remote response system 306, can be returned to the client device, where it is used in executing an application on the client device. Depending upon implementation-specific or other considerations, the intercepted API remote response system 306 can mirror the client 304. In mirroring the client device 304, the intercepted API remote response system 306 can execute an application as the application is executed on the client device 304 in the same manner that the application is executed on the client device 304. In mirroring the client device 304, the intercepted API remote response system 306 can use device characteristics data, e.g. registry settings, of the client device 304.

In a specific implementation, the intercepted API remote response system 306 functions to manipulate an API request before executing the API request. In manipulating an intercepted API request, the intercepted API remote response system 306 can execute multiple API requests for difference client devices simultaneously, even if the intercepted API request is the same. Depending upon implementation-specific or other considerations, the intercepted API remote response system can modify an intercepted API request based on the client device from which the intercepted API request is received.

In the example system shown in FIG. 3, the intercepted API remote response system 306 includes a remote response system communication engine 308, an API datastore 310, an API request manipulation engine 312, an API response determination engine 314, an API response datastore 316, and an API response comparison engine 318. In a specific implementation, the remote response system communication engine 308 functions to communicate with the client device 304. In communicating with the client device 304, the remote response system communication engine 308 can receive intercepted API requests from the client device 304. Depending upon implementation-specific or other considerations, the remote response system communication engine 308 can receive device characteristics data from the client device. Further, in communicating with the client device 304, the remote response system communication engine 308 can send determined API response to intercepted API requests back to the client device 304.

In a specific implementation, the API datastore 310 functions to store APIs. APIs stored in the API datastore can be public APIs or private APIs. Depending upon implementation-specific or other considerations APIs stored in the API datastore can be received from a developer of an application executing on the client device 304. Further depending upon implementation-specific or other considerations, APIs stored in the API datastore can be web APIs.

In a specific implementation, the API request manipulation engine 312 functions to manipulate API requests intercepted at the client device 304. In manipulating API requests, the API request manipulation engine 312 can change or otherwise modify the API requests. In manipulating API requests, the client device 304 is agnostic as to whether the API requests are modified by the API request manipulation engine 312. Specifically, as the API requests are manipulated at the intercepted API remote response system 306 and API responses to the API requests are sent back to the client device 304, the client device is unaware that any changes are made to the API requests in order to generate the API responses. Depending upon implementation-specific or other considerations, the API request manipulation engine 312 can manipulate an intercepted API request according to the client device at which the API request is intercepted. For example, the API request manipulation engine 312 can manipulate an intercepted API request to allow for a client device to be mirrored in execution of an application. Further depending upon implementation-specific or other considerations, the API request manipulation engine 312 can manipulate an API request according to device characteristics data for a client device. For example, the API request manipulation engine 312 can manipulate an API request to allow a response to the API request to be determined based on registry settings of a client device.

In a specific implementation, the API request manipulation engine 312 manipulates an intercepted API request based on a client device at which the API request was intercepted to allow for the determination of API responses for intercepted API requests from the multiple client devices. Depending upon implementation-specific or other considerations, the API request manipulation engine 312 can manipulate an API request to differentiate it from an API request received from another client device. For example, if a first intercepted API request for opening a file is received from a first client device and a second intercepted API request for opening the file is received from a second client device, then the API request manipulation engine can change the first intercepted API request to reflect that it is for the first client device and change the second intercepted API request to reflect that it is for the second client device. In manipulating intercepted API requests to allow for determined API responses, the API request manipulation engine 312 can modify an API call of an API request based on a client device from which the API request is intercepted. For example, if an API request is received from a first client device, then the API request manipulation engine 312 can modify the API call of the API request to indicate that the API request was received from the first client device.

In a specific implementation, the API response determination engine 314 functions to determine an API response to an intercepted API request received from a client device. In determining an API response to an intercepted API request, the API response determination engine 314 can execute an API according to an API request received from a client device. In executing an API according to an API request, the API response determination engine 314 can retrieve an API used in generating an API response from the API datastore 310 based on the intercepted API request. Further, in determining an API response according to an API request, the API response determination engine 314 can execute the API using an API request received from a client device and an API retrieved from the API datastore 310. Depending upon implementation-specific or other considerations, the API response determination engine 314 can determine an API to use in determining an API response based on an intercepted API request received from the client device 304. Further depending upon implementation-specific or other considerations, the API response determination engine 314 functions to determine an API response to an intercepted API request manipulated by the API request manipulation engine 312.

In a specific implementation, the API response datastore 316 functions to store API responses as determined by the API response determination engine 314. The API response datastore 316 can store API responses determined by the API response determination engine 314 in response to API requests received from client devices. Depending upon implementation-specific or other considerations, the API response datastore 316 can be configured to store API responses for a specific amount of time. For example, the API response datastore 316 can be configured to store the API response for 30 days. Further depending upon implementation-specific or other considerations, the API response datastore 316 can be configured to store API responses according to a client device for which they are generated. For example, the API response datastore 316 can store all API responses for a client device in an appropriate subset of the datastore for the client device. Depending upon implementation-specific or other considerations, the API response datastore can store intercepted API requests for which API responses are determined.

In a specific implementation, the remote response system communication engine 308 functions to send determined API responses back to client devices from which intercepted API requests are received. The remote response system communication engine 308 can send a determined API response for an intercepted API request back to the client device from which the intercepted API request is received. The remote response system communication engine 308 can return an API response as determined by the API response determination engine 314.

In a specific implementation, the API response comparison engine 318 functions to compare a determined API response with a previously determined API response. In comparing API responses, the API response comparison engine 318 can determine whether an API response is the same for the same intercepted API request. For example, if the same API request is received again, the API response comparison engine 318 can determine whether an API response determined for the same intercepted API request has changed from when the intercepted API request was previously determined. Depending upon implementation-specific or other considerations, the API response comparison engine 318 can be configured to determine whether an API response has changed if the same intercepted API request is received from the same client device. In determining whether a determined API response has changed, the API response comparison engine 318 can look up an API response corresponding to the API request in the API response datastore 316 and compare it to the determined API response.

In a specific implementation, the remote response system communication engine 308 functions to send an unchanging notification to the client device 304 indicating that an API response has not changed for a given intercepted API request. The remote response system communication engine 308 can send an unchanging notification to the client device if the API response comparison engine 318 determines an API response to an intercepted API request has not changed. Depending upon implementation-specific or other considerations, an unchanging notification is a token indicating that an API response has not changed. An unchanging notification can include an identification of an API request, for which an API response has not changed.

In an example of operation of the example system shown in FIG. 3, the remote response system communication engine 308 receives an intercepted API request from the client device 304. In the example of operation of the example system shown in FIG. 3, the API request manipulation engine 312 manipulates the API request according to the client device 304. Further, in the example of operation of the example system shown in FIG. 3, the API response determination engine 314 determines an API response to the API request using a corresponding API stored in the API datastore 310. In the example of operation of the example system shown in FIG. 3, the API response comparison engine 318 compares the API response to a previously determined API response for the intercepted API request to determine if they are different. Additionally, in the example of operation of the example system shown in FIG. 3, the remote response system communication engine 308 sends either the determined API response or an unchanging notification based on whether the API response comparison engine determines that the API response has changed.

Figure 4:
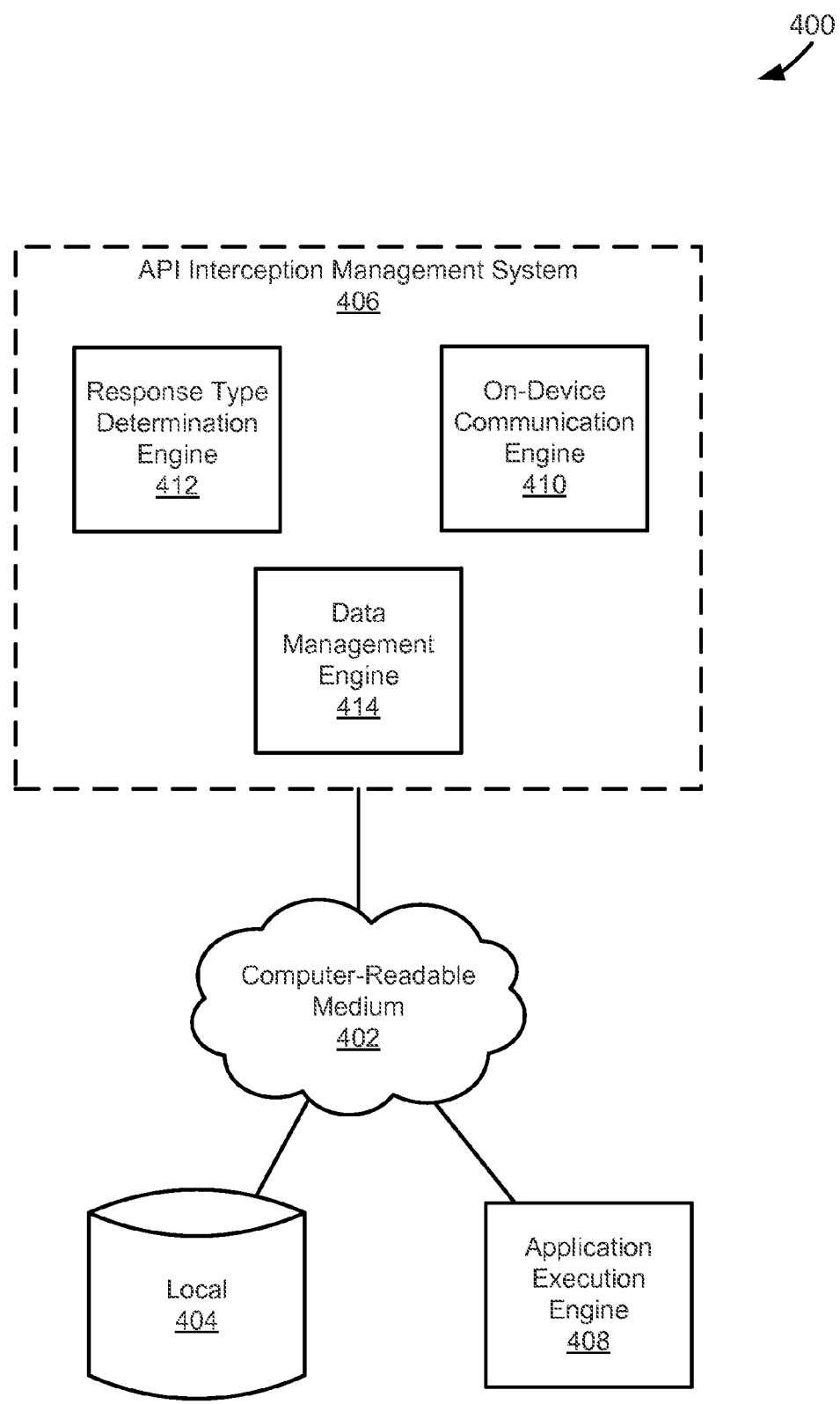
FIG. 4 depicts a diagram of an example of a system for executing an application at a client device using API responses determined remotely from the client device.

FIG. 4 depicts a diagram 400 of an example of a system for executing an application at a client device using API responses determined remotely from the client device. The example system shown in FIG. 4 includes a computer-readable medium 402, a local datastore 404, an API management system 406, and an application execution engine 408. In the example system shown in FIG. 4, the local datastore 404, the API interception management system 406, and the application execution engine 408 are coupled to each other through the computer-readable medium. Additionally, in the example system shown in FIG. 4, the local datastore 404, the API interception management system 406, and the application execution engine 408 are implemented as part of a client device.

In a specific implementation, the local datastore 404 functions as an applicable datastore for storing data locally at a client device. Depending upon implementation-specific or other considerations, the local datastore can include cache of a client device. The local datastore 404 can store either or both intercepted API requests and received API responses to the intercepted API requests. Received API responses to intercepted API requests can be used in the execution of an application at the client device.

In a specific implementation, the API interception management system 406 functions according to an applicable system for managing intercepted API requests for satisfaction remotely away from a client device, such as the API interception management systems described in this paper. In managing interception of API requests, the API interception management system 406 can function to intercept API requests as an application is executing on the client device. Additionally, in managing interception of API requests, the API interception management system 406 can send intercepted API requests to a system remote from the client device, where the intercepted API requests can be satisfied.

In a specific implementation, the API interception management system 406 functions to receive API responses to intercepted API requests. The API interception management system 406 can receive API response from an applicable remote system for satisfying API requests, such as the intercepted API remote response systems described in this paper. Additionally, the API interception management system 406 can receive unchanging notifications from an applicable remote system for satisfying API requests, such as the intercepted API remote systems described in this paper. Based upon received unchanging notifications, the API interception management system can retrieve an API response to an intercepted API request from the local datastore 404.

In a specific implementation, the application execution engine 408 functions to manage execution of an application at the client device. The application execution engine 408 can manage execution of an application using API responses for intercepted API requests. The application execution engine 408 can receive API responses from the API interception management system 406 for use in executing an application. Depending upon implementation-specific or other considerations, API responses provided to the application execution engine 408 can be received from an applicable remote system for satisfying API requests, such as the intercepted API remote systems described in this paper. Further depending upon implementation-specific or other considerations, API responses provided to the application execution engine 408 can be retrieved from the local datastore 404.

In the example system shown in FIG. 4, the API interception management system 406 includes an on-device communication engine 410, a response type determination engine 412, and a data management engine 414. In a specific implementation, the on-device communication engine 410 functions according to an applicable system for sending and receiving data at the client device, such as the on-device communication engines described in this paper. Depending upon implementation-specific or other considerations, the on-device communication engine can receive API responses to intercepted API requests from an applicable remote system for satisfying API requests, such as the intercepted API remote response systems described in this paper. Further depending upon implementation-specific or other considerations, the on-device communication engine can receive unchanging notifications from an applicable remote system for satisfying API requests, such as the intercepted API remote response systems described in this paper. An unchanging notification received by the on-device communication engine 410 can be a token.

In a specific implementation, the response type determination engine 412 functions to determine a response type of responses received by the on-device communication engine 410. Depending upon implementation-specific or other considerations, the response type determination engine 412 can determine that a response received by the on-device communication engine 410 is an API response to an intercepted API request. Further depending upon implementation-specific or other considerations, the response type determination engine 412 can determine that a response received by the on-device communication engine 410 is an unchanging notification.

In a specific implementation, the data management engine 414 functions to manage delivery of API responses to the application execution engine 408. In managing delivery of API response to the application execution engine 408, the data management engine 414 can provide API responses to the application execution engine 408. The data management engine 414 can manage delivery of API response to the application execution engine 408 based on a determined response type of responses received by the on-device communication engine 410, as determined by the response type determination engine 412. Depending upon implementation-specific or other considerations, if the response type determination engine 412 determines that a response received by the on-device communication engine is an API response, then the data management engine 414 can provide the API response, as received, to the application execution engine 408. Additionally, the data management engine 414 can remove a previous API result for an API response from the local datastore 404 if a new API result is received. Further depending upon implementation-specific or other considerations, the response type determination engine 412 determines that a response received by the on-device communication engine is an unchanging notification, then the data management engine 414 can retrieve an API response to an intercepted API request from the local datastore 404, and provide the API response to the application execution engine 408. Depending upon implementation-specific or other considerations, the data management engine 414 can retrieve an API response based on a received unchanging notification, using an identification of an API request included as part of the unchanging notification.

In an example of operation of the example system shown in FIG. 4, the on-device communication engine 410 receives responses to intercepted API requests from an applicable remote system for satisfying API requests, such as the intercepted API remote response systems described in this paper. In the example of operation of the example system shown in FIG. 4, the response type determination engine determines whether response received by the on-device communication engine 410 are API responses to intercepted API requests or unchanging notifications. Further, in the example of operation of the example system shown in FIG. 4, the data management engine 414 provides the API responses, as received by the on-device communication engine 410, to the application execution engine if the response type determination engine determines the responses are API responses. In the example of operation of the example system shown in FIG. 4, the data management engine 414 retrieves the API responses from the local datastore 404 and provides the retrieved API responses to the application execution engine 408 if the response type determination engine 412 determines that the responses received by the on-device communication engine are unchanging notifications.

Figure 5:
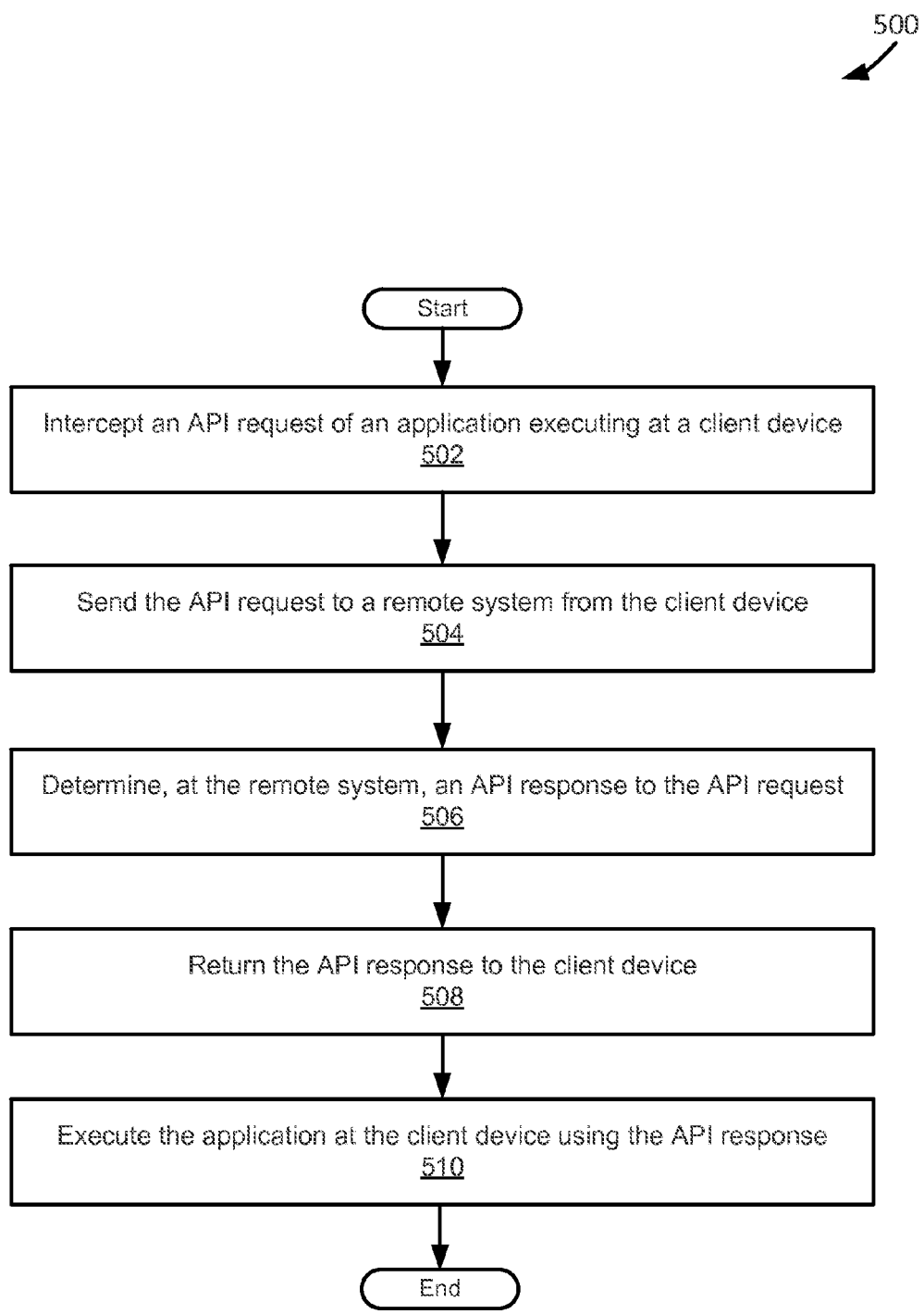
FIG. 5 depicts a flowchart of an example of a method for satisfying API requests of an application executing at a client device remotely.

FIG. 5 depicts a flowchart 500 of an example of a method for satisfying API requests of an application executing at a client device remotely. The flowchart 500 begins at module 502, where an API request of an application executing at a client device is intercepted. An API request can be intercepted by an API request interception engine. An API request interception engine that intercepts an API request can be implemented between an application executing in an application layer and an operating system executing in an operating system layer or as part of the operating system layer. Depending upon implementation-specific or other considerations, an API request can be intercepted at a client device according to remote access rules.

The flowchart 500 continues to module 504, where the API request is sent to a remote system from the client device. The API request can be sent to an intercepted API remote response system included as part of an accelerated remote operations system server capable of determining an API response to the API request. The API request can be sent by an on-device communication engine present on the client device.

The flowchart 500 continues to module 506, where, at the remote system, an API response is determined for the API request. An API response can be determined by an API response determination engine. An API response determination engine can retrieve an API and use it to execute the API request in determining an API response. Depending upon implementation-specific or other considerations, an API request manipulation engine can manipulate the API response based on the client device, before an API response is determined. Further depending upon implementation-specific or other considerations, in determining an API response, the application executing on the client device is mirrored on the remote system using device characteristics data, e.g. registry settings of the client device. Depending upon implementation-specific or other considerations, the API response can be stored at the remote system.

The flowchart 500 continues to module 508, where the API response is returned to the client device. The API response can be sent to the client device by a remote response system communication engine. The API response can be received at the client device by an on-device communication engine. Depending upon implementation-specific or other considerations, in determining the API response at a system remote from the client device, the application executing at the client device can be virtualized on the client device.

The flowchart 500 continues to module 510, where the application is executed using the API response. An application execution engine can execute the application using the API response. A data management engine can be configured to store the API response in a local datastore. By storing the API response in a local datastore, the API response can be retrieved at later times when it is needed in the execution of the application.

Figure 6:
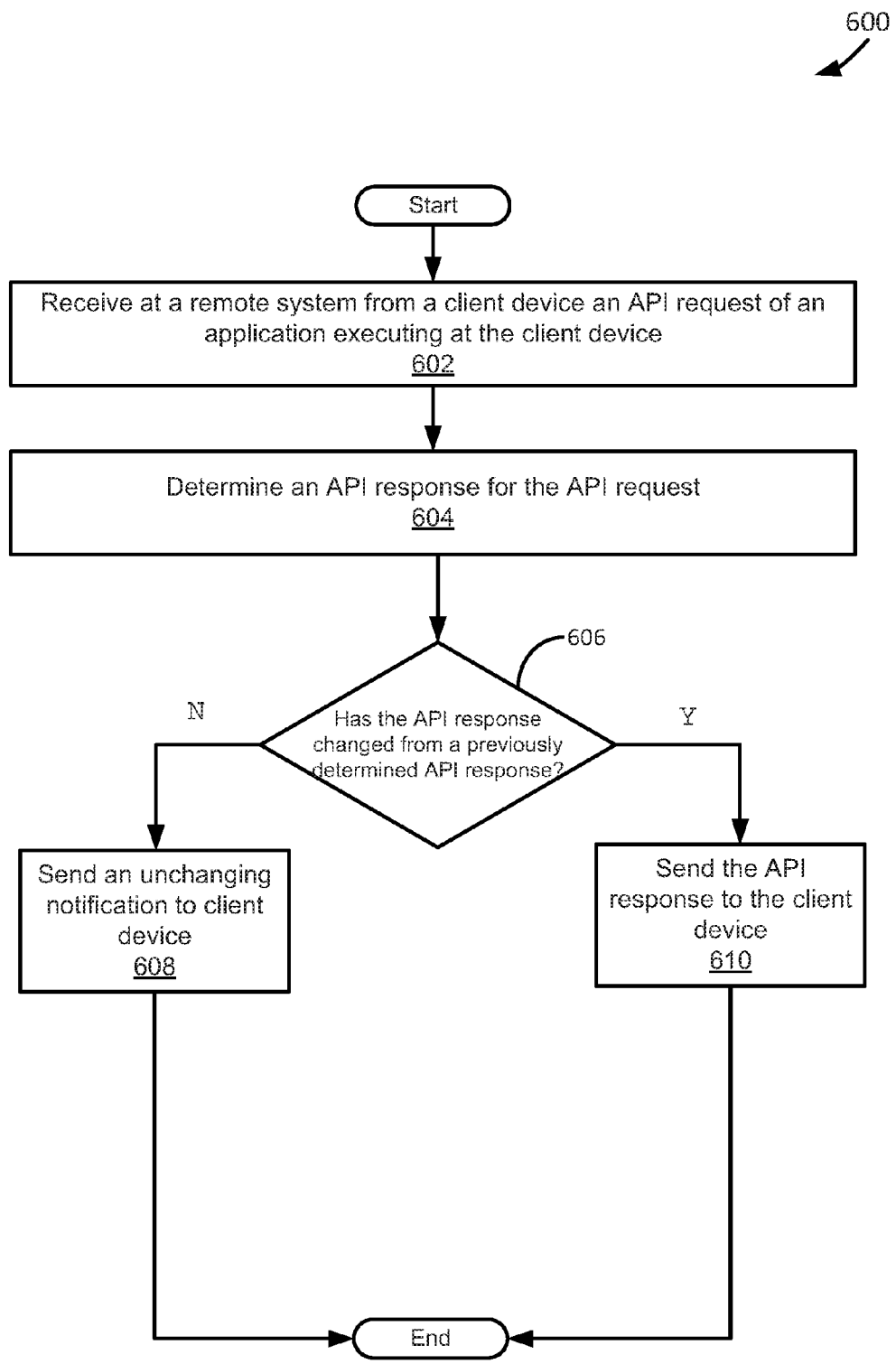
FIG. 6 depicts a flowchart of an example of another method for satisfying API requests of an application executing at a client device remotely.

FIG. 6 depicts a flowchart 600 of an example of another method for satisfying API requests of an application executing at a client device remotely. The flowchart begins at module 602, where an API request of an application executing at a client device is received at a remote system from the client device. An API request can be received by an API interception management system. Depending upon implementation-specific or other considerations, an API request can be intercepted at a client device according to remote access rules. A remote response system communication engine can receive an intercepted API request from a client device.

The flowchart 600 continues to module 604, where an API response for the API request is determined. An API response can be determined by an API response determination engine. An API response determination engine can retrieve an API and use it to execute the API request in determining an API response. Depending upon implementation-specific or other considerations, an API request manipulation engine can manipulate the API response based on the client device, before an API response is determined. Further depending upon implementation-specific or other considerations, in determining an API response, the application executing on the client device is mirrored on the remote system using device characteristics data, e.g. registry settings of the client device. Depending upon implementation-specific or other considerations, the API response can be stored at the remote system.

The flowchart 600 continues to decision point 606 where it is determined whether the API response has changed from a previously determined API response for the API request. An API response comparison engine can determine whether the API response has changed from a previously determined API response for the API request. For example, the API response comparison engine can look up in datastore at the remote system, what the previously determined API response is and compare it to the currently determined API response.

If it is determined at decision point 606 that the API response remains unchanged from the previously determined API response, then the flowchart 600 continues to module 608. At module 608, an unchanging notification can be returned to the client device. An unchanging notification can indicate to the client device that the API response previously received by the client device is still valid to use in executing the application. An unchanging notification can be a token.

If it is determined at decision point 606 that the API response has changed from the previously determined API response, then the flowchart 600 continues to module 610. At module 610 the currently determined API response is sent to the client device. Depending upon implementation-specific or other considerations, the client device can flush its local storage to remove the previously determined API response from the local storage.

Figure 7:
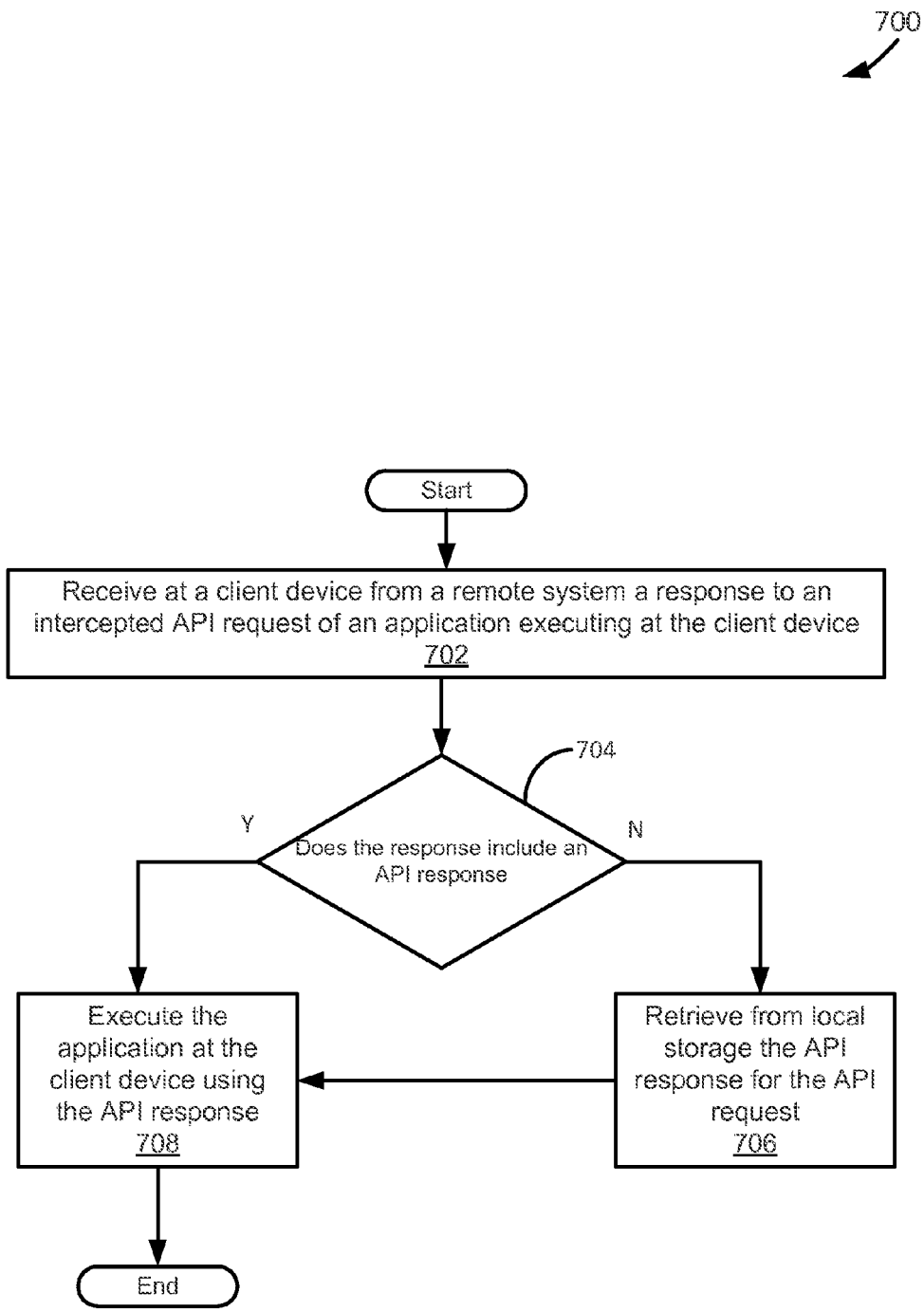
FIG. 7 depicts a flowchart of an example of satisfying an API request of an application executing at a client device through a response to the API request received from a remote system to which the API request was sent.

FIG. 7 depicts a flowchart 700 of an example of satisfying an API request of an application executing at a client device through a response to the API request received from a remote system to which the API request was sent. The flowchart 700 begins at module 702, where a response to an intercepted API request is received at a client device from a remote system. A response can be received from an intercepted API remote response system according to an API request intercepted at a client device for an application executing on the client device. Depending upon implementation-specific or other considerations, a response can include an API response to an intercepted API request.

The flowchart 700 continues to decision point 704, where it is determined if the response includes an API response. Whether the response includes an API response can be determined by a response type determination engine integrated as part of an API interception management system on the client device. Depending upon implementation-specific or other considerations, if the response fails to include an API response, then it can be assumed that the response is an unchanging notification.

If it is determined at decision point 704, that the response fails to include an API response, then the flowchart 700 continues to module 706. At module 706, the API response is retrieved from local storage at the client device. A data management engine can retrieve the API response from local storage at the client device. Depending upon implementation-specific or other considerations, the response received from the remote system can include an identification of the API request, which can be used to look up the API response in local storage.

If it is determined at decision point 704 that the response includes an API response, then the flowchart 700 continues to module 708, where the application is executed using the API response. An application execution engine can execute the application using the API response.

Figure 8:
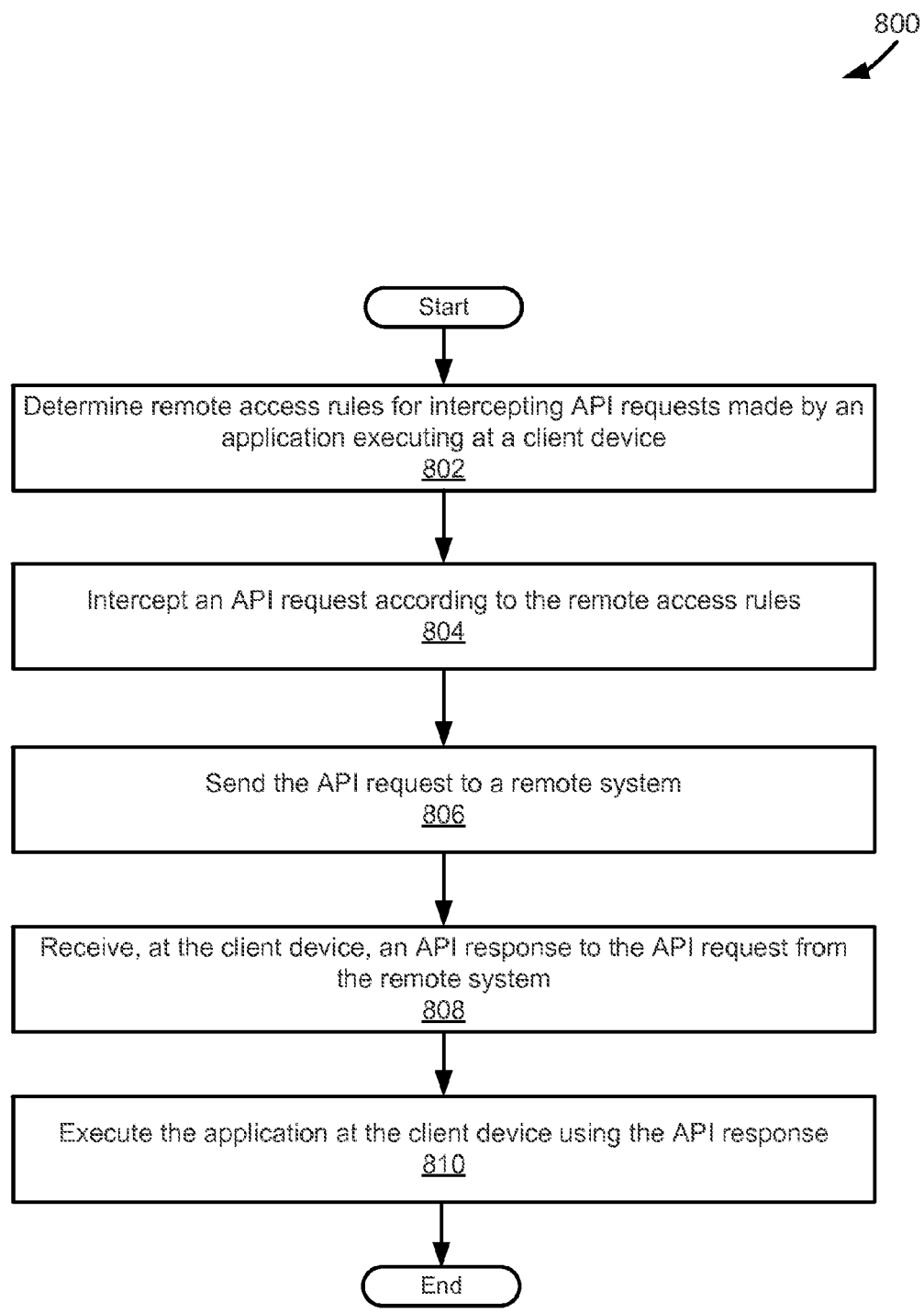
FIG. 8 depicts a flowchart of an example of another method for satisfying API requests, intercepted according to remote access rules, of an application executing at a client device remotely.

FIG. 8 depicts a flowchart 800 of an example of another method for satisfying API requests, intercepted according to remote access rules, of an application executing at a client device remotely. The flowchart 800 begins at module 802, where remote access rules for intercepting API requests made by an application executing at a client device are determined. A remote access rules management engine implemented as part of an API interception management system at a client device can determine remote access rules. Depending upon implementation-specific or other considerations, remote access rules can be determined according to input from a user or an administrator. Further depending upon implementation-specific or other considerations, remote access rules can be determined based on previous execution of an application. For example, if during previous execution of an application, a response to a specific API request is found to be large, then remote access rules can be generated specifying to intercept the specific API request.

The flowchart 800 continues to module 804, where an API request is intercepted at the client device according to the remote access rules. An API request interception engine can function to intercept an API request at the client device according to the remote access rules. An API request interception engine that intercepts an API request can be implemented between an application executing in an application layer and an operating system executing in an operating system layer or as part of the operating system layer. Depending upon implementation-specific or other considerations, an API request can be intercepted at a client device according to remote access rules.

The flowchart 800 continues to module 806, where the API request is sent to a remote system from the client device. The API request can be sent to an intercepted API remote response system included as part of an accelerated remote operations system server capable of determining an API response to the API request. The API request can be sent by an on-device communication engine present on the client device.

The flowchart 800 continues to module 808, where the API response is returned to the client device. The API response can be sent to the client device by a remote response system communication engine. The API response can be received at the client device by an on-device communication engine. Depending upon implementation-specific or other considerations, in determining the API response at a system remote from the client device, the application executing at the client device can be virtualized on the client device.

The flowchart 800 continues to module 810, where the application is executed using the API response. An application execution engine can execute the application using the API response. A data management engine can be configured to store the API response in a local datastore. By storing the API response in a local datastore, the API response can be retrieved at later times when it is needed in the execution of the application.

Figure 9:
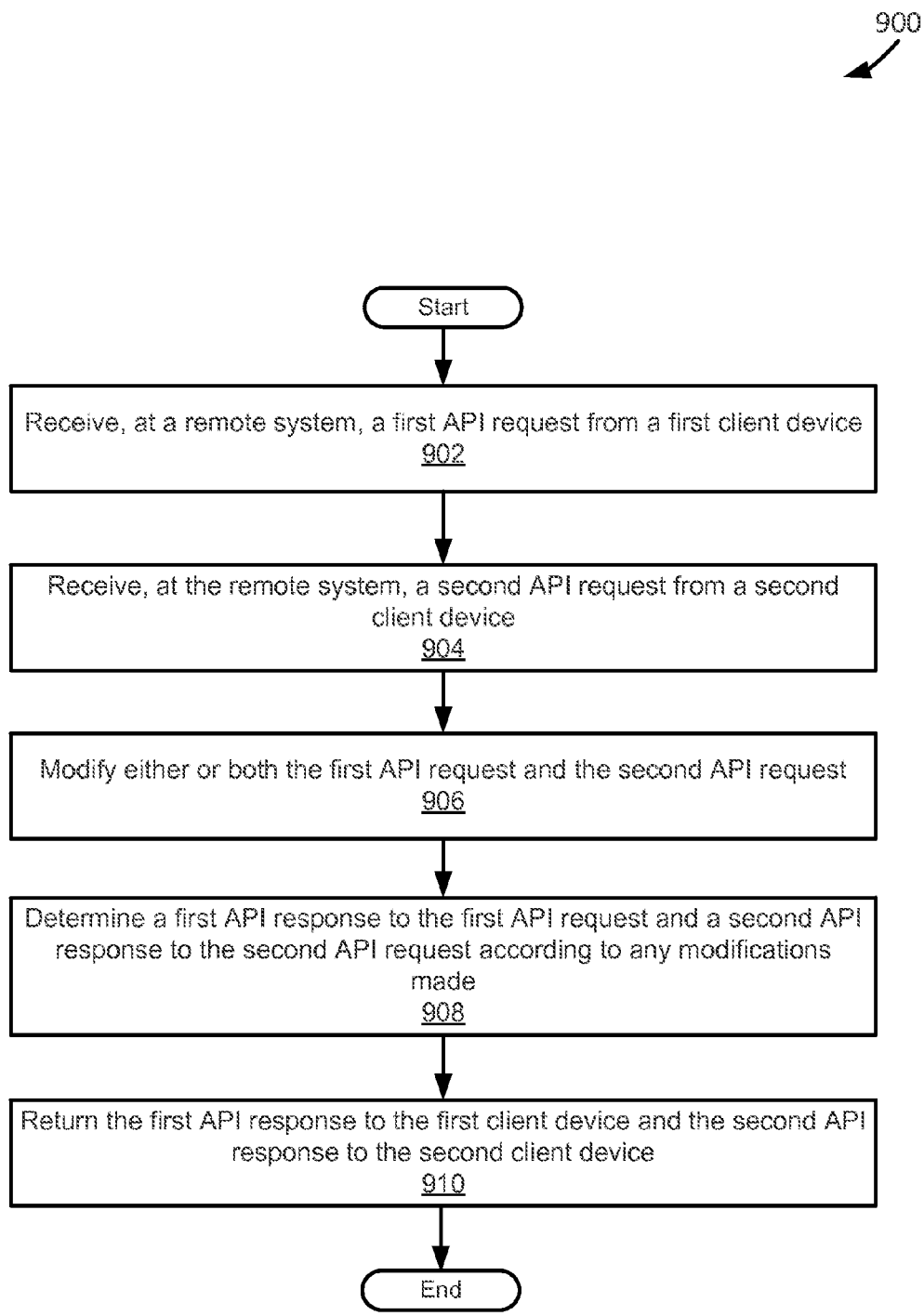
FIG. 9 depicts a flowchart of an example of another method for satisfying API requests of application executing at first and second client devices remotely.

FIG. 9 depicts a flowchart 900 of an example of another method for satisfying API requests of application executing at first and second client devices remotely. The flowchart 900 begins at module 902, where a first API request from a first client device is received at a remote system. The remote system can be an intercepted API remote response system included as part of an accelerated remote operations system server. A first API request can be intercepted at a first client device according to remote access rules.

The flowchart 900 continues to module 904, where a second API request from a second client device is received at the remote system. Depending upon implementation-specific or other considerations, the first API request and the second API request can be the same API request, and just originate from two different client devices. The first and second API requests can be received at the remote system through a remote response system communication engine 308.

The flowchart 900 continues to module 906, where either or both the first API request and the second API request are modified. The API requests can be modified by an API request manipulation engine. Depending upon implementation-specific or other considerations, the API requests can be modified according to the client device at which the API requests are intercepted. For example, the API requests can be manipulated to allow for the client devices to be mirrored in execution of an application. Further depending upon implementation-specific or other considerations, the API requests can be manipulated according to device characteristics data for the client devices. For example, the API request manipulation engine 312 can manipulate an API request to allow a response to the API request to be determined based on registry settings of a client device. Depending upon implementation-specific or other considerations, the API requests can be modified to distinguish them from each other. For example, an API call of the API requests can be modified to indicate which client devices sent the API requests.

The flowchart 900 continues to module 908, where a first API response to the first API request is determined and a second API response to the second API request are determined according to any modifications made to the API responses at module 906. A first and second API response can be determined by an API response determination engine. An API response determination engine can retrieve an API and use it to execute the first and second API requests in determining first and second API responses. Further depending upon implementation-specific or other considerations, in determining an API response, the applications executing on the client devices are mirrored on the remote system using device characteristics data, e.g. registry settings of the client devices. Depending upon implementation-specific or other considerations, the first and second API responses can be stored at the remote system.

The flowchart 900 continues to module 910, where the first API response is returned to the first client device and the second API response is returned to the second client device. The API responses can be sent to the client devices by a remote response system communication engine. The API responses can be received at the client devices by on-device communication engines. The API responses can be used in the execution of the applications on the corresponding client devices.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
receiving from a client device, at an accelerated remote operations system server remote from the client device, an intercepted API request of an application executing at the client device and registry settings of the client device, wherein the API request is a request to access a file from a file system;
determining, at the accelerated remote operations system server, an API response to the API request using an API, wherein determining an API response to the API request using an API comprises mirroring execution of the application, which is executing at the client device, at the accelerated remote operations system server using registry settings of the client device;
comparing, at the accelerated remote operations system server, the API response to a previously determined API response for the API request to determine if the API response has changed, wherein comparing the API response to a previously determined API response for the API request to determine if the API response has changed comprises looking up the previously determined API response for the API request in an API response datastore and comparing the previously determined API response for the API request to the API response for the API request;
sending a response from the accelerated remote operations system server to the client device, the response based on whether the API response has changed and used to continue execution of the application at the client device, wherein the response sent to the client device includes an unchanging notification if the API response has not changed.

2. The method of claim 1, wherein the response sent to the client device includes the API response if the API response has changed.

3. The method of claim 1, further comprising:
retrieving, at the client device, the API response from local storage at the client device using the unchanging notification when the response sent to the client device includes the unchanging notification;
using the API response to continue execution of the application at the client device.

4. The method of claim 1, wherein the API request is intercepted according to remote access rules specifying which API requests to intercept.

5. The method of claim 4, wherein the remote access rules are generated based on a previous execution of the application on the client device.

6. The method of claim 1, further comprising:
receiving, at the accelerated remote operation system server, device characteristics data for the client device;
modifying the API request according to the device characteristics to generate a modified API request;
executing the modified API request to determine the API modified response.

7. The method of claim 6, further comprising:
receiving from a second client device, at the accelerated remote operations system server remote from the second client device, an intercepted second API request of a second application executing at the second client device and registry settings of the second client device, wherein the second API request is a request to access a file from a file system;
modifying either or both the API request and the second API request to distinguish the API request from the second API request;
determining, at the accelerated remote operations system server, a second API response to the second API request using an API, wherein determining a second API response to the second API request using an API comprises mirroring execution of the second application, which is executing at the second client device, at the accelerated remote operations system server using the registry settings of the second client device;
comparing, at the accelerated remote operations system server, the second API response to a previously determined second API response for the second API request to determine if the second API response has changed, wherein comparing the second API response to a previously determined API response for the second API request to determine if the second API response has changed comprises looking up the previously determined API response for the second API request in the API response datastore and comparing the previously determined second API response for the second API request to the second API response for the second API request;
sending a second response from the accelerated remote operations system server to the second client device, the second response based on whether the second API response has changed and used to continue execution of the second application at the second client device.

8. The method of claim 7, wherein the API request and the second API request are the same.

9. The method of claim 7, wherein modifying either or both the API request and the second API request includes modifying an API call of either or both the API request and the second API request.

10. A non-transitory computer-readable medium that stores computer readable instructions, which when executed by at least one processor, implement a system comprising:
a remote response system communication engine, at an accelerated remote operations system server remote from a client device, configured to receive from the client device an intercepted API request of an application executing at the client device and registry settings of the client device, wherein the API request is a request to access a file from a file system;

an API response determination engine, at the accelerated remote operations system server, configured to determine an API response to the API request using an API, wherein determining an API response to the API request using an API comprises mirroring execution of the application, which is executing at the client device, at the accelerated remote operations system server using the registry settings of the client device;

an API response datastore, at the accelerated remote operations system server, that stores previously determined API responses for API requests;

an API response comparison engine, at the accelerated remote operations system server, configured to compare the API response to a previously determined API response for the API request to determine if the API response has changed, wherein comparing the API response to a previously determined API response for the API request to determine if the API response has changed comprises looking up the previously determined API response for the API request in the API response datastore and comparing the previously determined API response for the API request to the API response for the API request;

the accelerated remote operations system server configured to send a response from the accelerated remote operations system server to the client device, the response based on whether the API response has changed and used to continue execution of the application at the client device, wherein the response sent to the client device includes an unchanging notification if the API response has not changed.

11. The non-transitory computer-readable medium of claim 10, wherein the response sent to the client device includes the API response if the API response has changed.

12. The non-transitory computer-readable medium of claim 10, the system further comprising:
a data management engine, at the client device, configured to retrieve the API response from local storage at the client device using the unchanging notification when the response sent to the client device includes the unchanging notification;
an application execution engine, at the client device, configured to use the API response to continue execution of the application at the client device.

13. The non-transitory computer-readable medium of claim 10, wherein the API request is intercepted according to remote access rules specifying which API requests to intercept.

14. The non-transitory computer-readable medium of claim 13, wherein the remote access rules are generated based on a previous execution of the application on the client device.

15. The non-transitory computer-readable medium of claim 10, the system further comprising:
the remote response system communication engine further configured to receive device characteristics data for the client device;
an API request manipulation engine configured to modify the API request according to the device characteristics to generate a modified API request;
the API response determination engine further configured to execute the modified API request to determine the API modified response.

16. The non-transitory computer-readable medium of claim 10, the system further comprising:
the remote response system communication engine further configured to receive from a second client device an intercepted second API request of a second application executing at the second client device and registry settings of the second client device, wherein the second API request is a request to access a file from a file system;
an API request manipulation engine configured to modify either or both the API request and the second API request to distinguish the API request from the second API request;
the API response determination engine further configured to determine a second API response to the second API request using an API, wherein determining a second API response to the second API request using an API comprises mirroring execution of the second application, which is executing at the second client device, at the accelerated remote operations system server using the registry settings of the second client device;
the API response comparison engine further configured to compare the second API response to a previously determined second API response for the second API request to determine if the second API response has changed, wherein comparing the second API response to a previously determined API response for the second API request to determine if the second API response has changed comprises looking up the previously determined API response for the second API request in the API response datastore and comparing the previously determined second API response for the second API request to the second API response for the second API request;
the accelerated remote operations system server further configured to send a second response from the accelerated remote operations system server to the second client device, the second response based on whether the second API response has changed and used to continue execution of the second application at the second client device.

17. The non-transitory computer-readable medium of claim 16, wherein the API request and the second API request are the same.

18. A system comprising:
means for receiving from a client device, at an accelerated remote operations system server remote from the client device, an intercepted API request of an application executing at the client device and registry settings of the client device, wherein the API request is a request to access a file from a file system;
means for determining, at the accelerated remote operations system server, an API response to the API request using an API, wherein determining an API response to the API request using an API comprises mirroring execution of the application, which is executing at the client device, at the accelerated remote operations system server using the registry settings of the client device;
means for comparing, at the accelerated remote operations system server, the API response to a previously determined API response for the API request to determine if the API response has changed, wherein comparing the API response to a previously determined API response for the API request to determine if the API response has changed comprises looking up the previously determined API response for the API request in an API response datastore and comparing the previously determined API response for the API request to the API response for the API request;

means for sending a response from the accelerated remote operations system server to the client device, the response based on whether the API response has changed and used to continue execution of the application at the client device, wherein the response sent to the client device includes an unchanging notification if the API response has not changed.

* * * * *